United States Patent Office 3,251,194
Patented May 17, 1966

3,251,194
METHOD OF MAKING AN ICE SKATING RINK
Harold J. Walker, Midland, Mich., assignor to The Dow Chemical Company, Midland, Mich., a corporation of Delaware
No Drawing. Filed Apr. 3, 1964, Ser. No. 357,271
6 Claims. (Cl. 62—66)

This invention concerns ice skating surfaces and an improved method for their preparation.

In the preparation of ice skating surfaces, particularly on earthen surfaces of the home variety wherein an effective, inexpensive and trouble-free method of preparation has been desired, present systems leave much to be desired. At the present time, a level or levelled earthen surface is generally necessary. To retain the water and prevent seepage, a polyethylene or similar plastic film floor or liner is needed, together with a system of diking about the periphery. The plastic film must be carefully applied to prevent tearing. The diking, generally with 2 inch by 4 inch boards, also requires labor and care in its installation. On irregular or sloped ground surfaces, the cost and labor involved in the preparation discourage installation of skating rinks.

It has now been discovered that an outdoor skating area can be readily installed with a nominal investment in material and labor if an ice base is prepared wherein an aqueous gel of a water-dispersible, water-swellable polymer is applied over the ground surface and is frozen, as the skating surface per se or preparatory to the laying down and freezing of one or more additional layers of water.

The water-dispersible, water-swellable polymer referred to above is characterized as being water insoluble but dispersible in water to form a gel. This means the polymer imbibes water but does not form a solution in water which is infinitely water dilutable. At some point, upon the addition of further amounts of water, the aqueous gel dispersion will separate into visually distinct gel and water phases. When such polymers are dispersed in water, the solid polymer particles swell to form discrete, particulate, and usually translucent, gels. It is desirable that the gel capacity of the polymer be at least about 20 and preferably at least 100 or higher.

The gel capacity is determined by dispersing a given weight of the polymer in an amount of water in excess of that required to completely swell the polymer particles. Subsequently the free water is drained from the polymer gel and the weight of the gel is ascertained. The quotient of this weight divided by the initial weight of the polymer yields the gel capacity.

Techniques for preparing the water-dispersible, water-swellable polymers utilized herein are known. In general, such polymers can be described as being lightly crosslinked, i.e., containing from about 0.01 up to as much as 5 mole percent, monomer basis, of a polyunsaturated crosslinking agent having two or more $CH_2=C<$ groups which is copolymerized with one or more monounsaturated polymerizable monomers. By reference to the water-soluble polymer art, such polymers are prepared by incorporating a small amount of a suitable crosslinking monomer into a polymerization recipe which would otherwise produce a linear, water-soluble polymer. Patents which describe such lightly crosslinked, swellable polymers include U.S. Patents 2,810,716 and 3,021,269 and Canadian Patent 626,501.

Another method for the preparation of a lightly crosslinked, water-swellable polymer involves the use of high energy ionizing radiation to effect the crosslinking. A patent illustrative of the latter method is U.S. Patent 3,090,736.

A preferred class of water-swellable polymers encompasses lightly crosslinked, water-soluble alkane polymer having a plurality of anionic groups attached to the alkane polymer chain selected from the group consisting of caboxylate and sulfonate groups. Illustrative of the preferred polymers are lightly crosslinked, monovalent cation salts, i.e., alkali metal and ammonium salts, of polyacrylic, polymethacrylic, polysulfoethyl acrylic, polysulfoethyl methacrylic and polysulfoethyl itaconic acids. Other polymers include lightly crosslinked copolymers of acrylic, methacrylic and sulfoethyl acrylic and the like acids, and monovalent cation salts thereof, with suitable comonomers such as acrylamide, methacrylamide, N-alkyl substituted acrylamides, N-vinyl-2-oxazolidinone and N-vinyl pyrrolidinone. The acrylic acid moieties may be derived from the partial hydrolysis of acrylamide-type polymers. Still other water-swellable polymers are obtained as homopolymers of alkali metal and ammonium vinyl aromatic sulfonates such as sodium, potassium and ammonium styrene sulfonates and copolymers thereof with suitable comonomers such as acrylamide, sodium acrylate and potassium methacrylate. Additional comonomers which can be incorporated into the alkane polymer along with the carboxylate and sulfonate containing moieties include a variety of water-insoluble comonomers copolymerizable therewith such as styrene, methyl methacrylate, ethyl methacrylate, acrylonitrile, vinyl acetate and the like. It is necessary, when the comonomer is essentially water insoluble, to limit the amount used in the preparation of such copolymers to less than that amount which impairs the water swellability of the resulting polymer. Usually it is best if the amount of water-insoluble comonomer is maintained at a level less than about 40 percent by weight of the finished copolymer. A simple test suffices to indicate the upper limit of water-insoluble comonomer.

Another preferred class of water-swellable polymers used in the process of this invention is water-swellable, crosslinked polymers of acrylamide, alkali metal and/or ammonium acrylate and an effective amount of a difunctional chemical crosslinking agent, i.e., a compound having two $CH_2=C<$ groups.

In practice, to a water-dispersible, water-swellable polymer, or a mixture thereof, in particulate form, is added so much water as will be completely absorbed by the polymer so as to form a gel. A simple test suffices to determine the proportions required. In addition thereto, a small amount of excess water is sometimes used where a more fluid mass is desired. While any water-swellable, water-dispersible polymer can be used, economic considerations favor those having a gel capacity of at least 100 and preferably higher, as determined with distilled water. The gelled water is spread over the ground surface in a layer sufficient to cover the grass thereon or other irregularities, e.g., about one-half to one inch thick, when the temperature is or soon will be low enough to freeze water. When the gelled base is completely frozen, one or more additional thin layers of water are applied to the frozen gelled base, advantageously by sprinkling with a garden hose to give a smooth surface. If the gel is carefully applied, it is not necessary to apply and freeze successive layers of water on top of the frozen gelled base.

Alternatively, particulate and, especially, powdered dry polymer can be applied to the ground, advantageously with a fertilizer spreader, followed by wetting with a water hose or sprinkler in amount sufficient to form a gel. Also, the dry polymers can be introduced into the water through an aspirator-type disperser placed in the hose line, proportions of polymer and water being adjusted so as to provide a gel.

The following examples describe completely repre-

Example 1

A partially hydrolyzed polymeric acrylamide, 0.2 mole percent crosslinked with methylene-bis-acrylamide, monomer basis, having about 30 mole percent of the carboxamide groups hydrolyzed to carboxylate groups, which carboxylate groups are in the sodium salt form, the degree of polymer hydrolysis analyzing as 42.7 percent sodium acrylate, having a gel capacity of 165 for hard siderations favor thse havingo a gel capacity of at least water and 661 for soft water, is added to about 15 gallons of tap water contained in a 20-gallon vessel, so as to provide a small excess of water over that required to form a gel. The excess water gives a more fluid mixture which can be worked more easily.

The gelled water is spread onto a ground area, advantageously by raking, to give a layer about one inch thick. At a temperature of 15°–20° F., the gelled water freezes quickly.

The above operation is repeated so as to provide a skating area of the desired size.

After the gelled water is completely frozen, a thin layer of water is applied to the frozen base by sprinkling with a garden hose. Upon freezing, the additional water layer gives a smooth skating surface. If the gel is applied carefully so as to give a smooth surface, however, additional water layers are not required.

After the winter months, the gelled mass may be left on the ground. With the passing of time, the gelled water gradually evaporates and the polymer degrades and is washed down into the soil by subsequent rains. Such polymers have a beneficial effect on the soil tilth, those which contain nitrogen also adding a fertilizing factor thereto.

Example 2

The procedure of Example 1, when repeated with any of the polymers heretofore disclosed, gives similar advantageous results.

What is claimed is:

1. In a method for forming an ice skating surface by freezing water on a supporting base, the improvement which comprises applying and freezing on said supporting base an aqueous gel of a water-dispersible, water-swellable polymer.

2. In a method for forming an ice skating surface by freezing water on an earthen surface, the improvement which comprises applying and freezing as a base surface on said earthen surface an aqueous gel of a water-dispersible, water-swellable polymer.

3. The method of claim 2 wherein at least one additional layer of water is applied to and frozen over the base surface.

4. The methd of claim 2 wherein the polymer is a lightly crosslinked alkane polymer containing a plurality of substituent anionic moieties of the group consisting of carboxylate and sulfonate groups.

5. The method of claim 2 wherein the polymer is a crosslinked partially hydrolyzed polyacrylamide.

6. The method of claim 2 wherein the polymer is a resinous polymeric acrylamide, 0.2 mole percent crosslinked with methylene-bis-acrylamide having about 30 mole percent of the carboxamide groups hydrolyzed to carboxylate groups, which carboxylate groups are in a monovalent cation salt form of the group consisting of the alkali metals and ammonium.

References Cited by the Examiner

UNITED STATES PATENTS

| | | | |
|---|---|---|---|
| 305,551 | 9/1884 | Vieweger | 62—235 |
| 2,193,219 | 3/1940 | Bowie et al. | |
| 2,793,963 | 5/1957 | Tym | 62—66 X |
| 2,800,456 | 7/1957 | Shepherd | 62—66 X |
| 2,932,170 | 4/1960 | Patterson et al. | 166—57 X |
| 3,016,713 | 1/1962 | Deming | 260—29.6 X |
| 3,140,269 | 7/1964 | Wahl | 260—29.6 |
| 3,181,612 | 5/1965 | West et al. | 166—33 |

ROBERT A. O'LEARY, *Primary Examiner*

MEYER PERLIN, WILLIAM F. O'DEA, *Examiners.*

W. E. WAYNER, *Assistant Examiner.*